United States Patent
Ahn (10) Patent No.: US 11,926,295 B2
(45) Date of Patent: Mar. 12, 2024

(54) ELECTRO-HYDRAULIC BRAKE DEVICE

(71) Applicant: HYUNDAI MOBIS CO., LTD., Seoul (KR)

(72) Inventor: Sung Ki Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/898,533

(22) Filed: Aug. 30, 2022

(65) Prior Publication Data
US 2023/0398972 A1    Dec. 14, 2023

(30) Foreign Application Priority Data
Jun. 13, 2022    (KR) .................. 10-2022-0071423

(51) Int. Cl.
*B60T 13/74* (2006.01)
*B60T 8/94* (2006.01)
*B60T 13/14* (2006.01)

(52) U.S. Cl.
CPC .............. *B60T 13/745* (2013.01); *B60T 8/94* (2013.01); *B60T 13/142* (2013.01); *B60T 2270/402* (2013.01)

(58) Field of Classification Search
CPC ............. B60T 13/142; B60T 2270/402; B60T 13/745; B60T 8/94
See application file for complete search history.

(56) References Cited

U.S. PATENT DOCUMENTS

| | | | |
|---|---|---|---|
| 2020/0033144 A1 | 1/2020 | Du et al. | |
| 2021/0101575 A1* | 4/2021 | Ahn | ...................... B60T 13/683 |

FOREIGN PATENT DOCUMENTS

| | | |
|---|---|---|
| CN | 109204262 A1 | 1/2019 |
| DE | 102012205862 A1 | 10/2012 |
| DE | 102013223861 A1 | 5/2015 |
| DE | 102013227065 A1 | 6/2015 |
| DE | 102015212552 A1 | 1/2016 |
| DE | 102014225956 A1 | 6/2016 |
| DE | 102014225958 A1 | 6/2016 |
| DE | 102016203111 A1 | 9/2016 |
| DE | 102017000472 A1 | 1/2017 |
| DE | 102016203119 A1 | 8/2017 |
| DE | 102018004811 A1 | 6/2018 |

(Continued)

OTHER PUBLICATIONS

Office Action dated Feb. 15, 2023 in the corresponding German Patent Application No. 102022123562.9.

(Continued)

*Primary Examiner* — Kenneth Bomberg
*Assistant Examiner* — Daniel S Collins
(74) *Attorney, Agent, or Firm* — NovoTechIP International PLLC (57) ABSTRACT

The present disclosure relates to an electric hydraulic brake device, which includes a main brake unit, which provides a braking fluid to a plurality of wheel cylinder units by driving a motor, a storage unit connected to the main brake unit and configured to store the braking fluid, and an auxiliary brake unit which is connected to the main brake unit and the storage unit and provides the braking fluid to some of the plurality of wheel cylinder units when an operation error of the main brake unit occurs and in which a hydraulic circuit is physically distinguished.

11 Claims, 12 Drawing Sheets

(56) References Cited

FOREIGN PATENT DOCUMENTS

| | | |
|---|---|---|
| DE | 102017200955 A1 | 7/2018 |
| DE | 102020103723 A1 | 4/2021 |
| DE | 102020104350 A1 | 4/2021 |
| DE | 102019217546 A1 | 5/2021 |
| DE | 102020134683 A1 | 5/2022 |
| DE | 102020134994 A1 | 5/2022 |
| KR | 10-2007-0104982 A | 10/2007 |
| KR | 10-2021-0041819 A | 4/2021 |
| KR | 1020210121857 A1 | 10/2021 |
| WO | 2018/219649 A1 | 12/2018 |

OTHER PUBLICATIONS

Office Action dated Dec. 13, 2023 in the corresponding Korean Patent Application No. 10-2022-0071423.

* cited by examiner

FIG.12

ELECTRO-HYDRAULIC BRAKE DEVICE

CROSS-REFERENCE TO RELATED APPLICATIONS

This application claims the benefit of priority to Korean Patent Application No. 10-2022-0071423, filed on Jun. 13, 2022, of which the disclosure is incorporated herein by reference in its entirety.

TECHNICAL FIELD

Exemplary embodiments of the present disclosure relate to an electro-hydraulic brake device, and more particularly, to an electro-hydraulic brake device in which auxiliary braking is quickly performed when a main braking error occurs, hydraulic circuits are clearly distinguished for each function, a set pressure control route is diversified, and bridging quality can be improved.

BACKGROUND

In general, an electro-hydraulic brake device controls a brake pressure of each wheel by a hydraulic pressure of a master cylinder driven by a motor after a pedal pressure of a driver is detected through a sensor.

The electro-hydraulic brake device includes a sensor that detects a stroke distance of a pedal to determine a brake pressure desired by the driver.

In addition, the electro-hydraulic brake device includes a pedal travel simulator that allows the driver to feel the same pedal pressure as that of a normal hydraulic brake device.

Accordingly, when the driver steps on a brake pedal, an electronic control unit detects a pedal pressure and supplies a hydraulic pressure to a master cylinder.

In addition, the master cylinder transmits a brake hydraulic pressure to a wheel cylinder of each wheel to provide a braking force to each wheel.

The conventional electro-hydraulic brake device cannot quickly provide a brake hydraulic pressure to a wheel cylinder when a motor is damaged, thereby causing an accident. Therefore, there is a need for improving the above problem.

The related art of the present disclosure is disclosed in Korean Patent Application No. 2007-0104982 (published on Oct. 30, 2007 and entitled "Control apparatus for valve in electro-hydraulic brake system").

SUMMARY

The present disclosure has been devised to improve the above problems, and an object of the present disclosure is to provide an electro-hydraulic brake device in which auxiliary braking is quickly performed when a main braking error occurs, hydraulic circuits are clearly distinguished for each function, a set pressure control route is diversified, and bridging quality can be improved.

An electro-hydraulic brake device according to the present disclosure includes a main brake unit which provides a braking fluid to a plurality of wheel cylinders by driving a motor, a storage unit connected to the main brake unit and configured to store the braking fluid, and an auxiliary brake unit which is connected to the main brake unit and the storage unit and provides the braking fluid to some of a plurality of wheel cylinder units when an operation error of the main brake unit occurs and in which a hydraulic circuit is physically distinguished.

The main brake unit may include a pedal cylinder unit that generates a hydraulic pressure when a driver presses or steps on the pedal, a master cylinder unit that detects the driver's pressing of the pedal and generates a hydraulic pressure by driving the motor, a first main hydraulic unit which is connected to the master cylinder unit and guides a braking fluid to some of the plurality of wheel cylinder units, a second main hydraulic unit which connects the master cylinder unit to the auxiliary brake unit and guides the braking fluid to the rest of the plurality of wheel cylinder units, and a third main hydraulic unit which connects or disconnects the first main hydraulic unit to or from the second main hydraulic unit.

The first main hydraulic unit may guide the braking fluid to the wheel cylinder unit disposed on a rear wheel, and the second main hydraulic unit guides the braking fluid to the wheel cylinder unit disposed on a front wheel.

The first main hydraulic unit and the auxiliary brake unit may be connected to allow the braking fluid to move.

The auxiliary brake unit may include a first auxiliary flow path unit configured to control the braking fluid after connecting the second main hydraulic unit and the wheel cylinder unit, a second auxiliary flow path unit configured to control the braking fluid after connecting the first auxiliary flow path unit and the electric pump unit, and a third auxiliary flow path unit configured to control the braking fluid after connecting the electric pump unit and the first auxiliary flow path unit.

The first auxiliary flow path unit may include a first flow path line unit connecting the second main hydraulic unit and the wheel cylinder unit to guide the braking fluid, and a first flow path valve unit which is formed in the first flow path line unit and opens or closes the first flow path line unit.

The second auxiliary flow path unit may include a second flow path line unit connecting the first auxiliary flow path unit and the electric pump unit to guide the braking fluid, and a second flow path valve unit which is formed in the second flow path line unit and opens or closes the second flow path line unit.

The second auxiliary flow path unit may further include a second flow path connection unit connecting the second flow path line unit and the storage unit.

The third auxiliary flow path unit may include a third flow path line unit connecting the electric pump unit and the first auxiliary flow path unit to guide the braking fluid, and a third flow path valve unit which is formed in the third flow path line unit and opens or closes the third flow path line unit.

The third flow path valve unit may open the third flow path line unit so that the braking fluid discharged from the electric pump unit is supplied to the wheel cylinder unit.

The auxiliary brake unit may include a fourth auxiliary flow path unit configured to control the braking fluid after connecting the third auxiliary flow path unit and the storage unit.

The fourth auxiliary flow path unit may include a fourth flow path line unit connecting the third auxiliary flow path unit and the storage unit to guide the braking fluid, and a fourth flow path valve unit which is formed in the fourth flow path line unit and opens or closes the fourth flow path line unit.

In the electro-hydraulic brake device according to the present disclosure, the main brake unit and the auxiliary brake unit are connected by a hydraulic circuit, and the auxiliary brake unit can be driven to perform braking when an operation error occurs in the main brake unit.

In the electro-hydraulic brake device according to an embodiment of the present disclosure, the first auxiliary flow path unit can control the braking fluid after connecting the main flow path unit and the wheel cylinder unit, the second auxiliary flow path unit can control the braking fluid after connecting the first auxiliary flow path unit and the electric pump unit, the third auxiliary flow path unit can control the braking fluid after connecting the electric pump unit and the first auxiliary flow path unit, and therefore, the hydraulic circuits can be physically divided according to a function.

In the electro-hydraulic brake device according to an embodiment of the present disclosure, the second auxiliary flow path unit is connected to the storage unit, and valve resistance to the braking fluid provided to the electric pump unit is omitted, therefore bridging quality can be improved.

DETAILED DESCRIPTION

Hereinafter, an electro-hydraulic brake device will be described below with reference to the accompanying drawings through various exemplary embodiments. For clarity and convenience in description, thicknesses of lines, sizes of constituent elements, and the like may be illustrated in an exaggerated manner in the drawings. In addition, terms described below are defined by considering functions according to the present disclosure and may vary according to the intention of a user or a manager or according to the common practices in the art. Therefore, definitions of these terms should be defined in light of details disclosed throughout the present specification.

Figure 1:
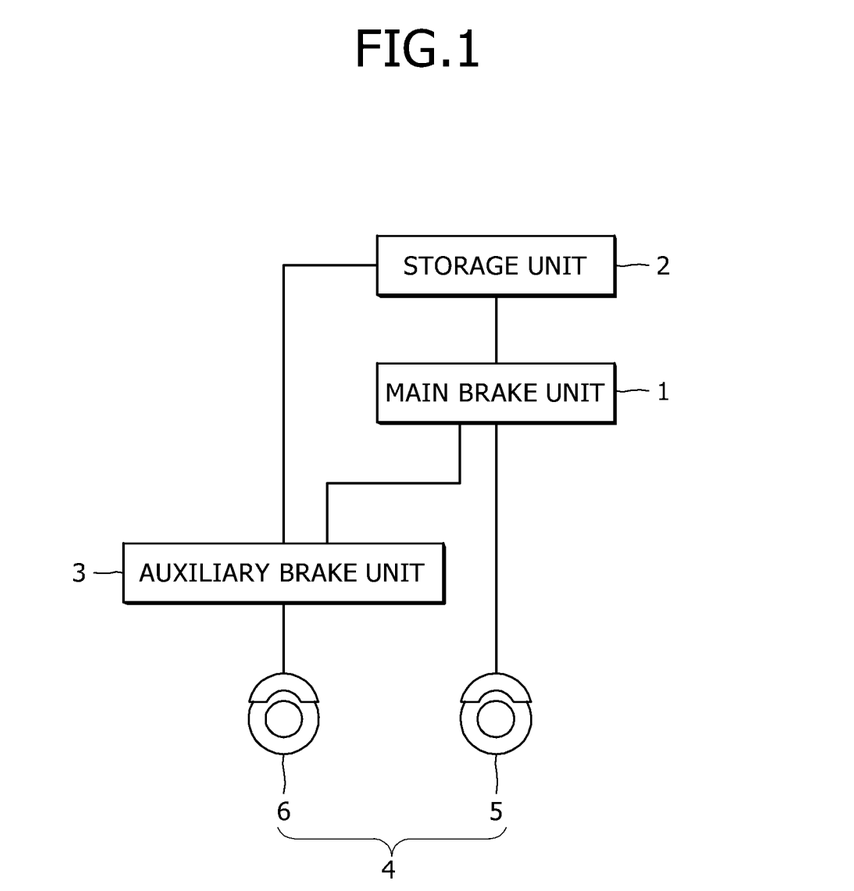
FIG. 1 is a block diagram schematically illustrating an electro-hydraulic brake device according to an embodiment of the present disclosure.

FIG. 1 is a block diagram schematically illustrating an electro-hydraulic brake device according to an embodiment of the present disclosure. Referring to FIG. 1, an electro-hydraulic brake device according to an embodiment of the present disclosure includes a main brake unit 1, a storage unit 2, and an auxiliary brake unit 3.

The main brake unit 1 provides a braking fluid to a plurality of wheel cylinder units 4 by driving a motor. The storage unit 2 is connected to the main brake unit 1. The storage unit 2 may be a reservoir, a fluid tank or the like, at which the braking fluid is temporarily stored. The auxiliary brake unit 3 is connected to the main brake unit 1 and the storage unit 2. The auxiliary brake unit 3 provides the braking fluid to some of the plurality of wheel cylinder units 4 when an operation error of the main brake unit 1 occurs. The auxiliary brake unit 3 is designed so that a hydraulic circuit is physically divided according to a function.

That is, the electro-hydraulic brake device according to the embodiment of the present disclosure can perform emergency braking by activating the auxiliary brake unit 3 when the operation error of the main brake unit 1 occurs in the electronic braking device of an electric vehicle, a hybrid vehicle, or an autonomous vehicle. In this case, the operation error of the main braking unit 1 may be a motor driving error or an operation error of various valves for controlling the hydraulic circuit.

Figure 2:
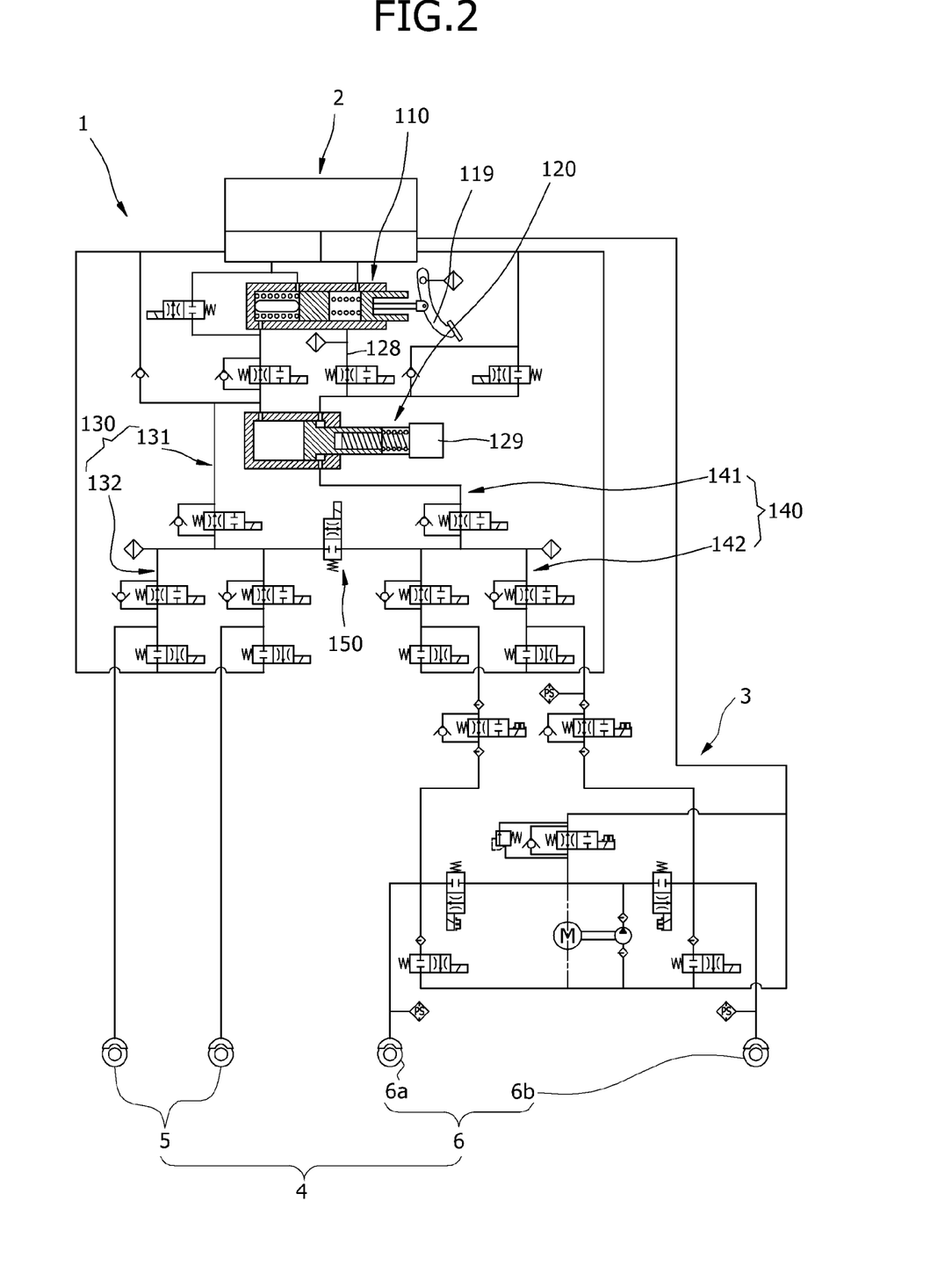
FIG. 2 is a view schematically illustrating an electro-hydraulic brake device according to an embodiment of the present disclosure.

FIG. 2 is a view schematically illustrating an electro-hydraulic brake device according to an embodiment of the present disclosure. Referring to FIG. 2, the main brake unit 1 according to the embodiment of the present disclosure includes a pedal cylinder unit 110, a master cylinder unit 120, a first main hydraulic unit 130, a second main hydraulic unit 140, and a third main hydraulic unit 150.

The pedal cylinder unit 110 generates a hydraulic pressure by a pedal 119 being stepped on. The pedal cylinder unit 110 may form two chambers and may provide a pedal force corresponding to an increased pressure of the pedal 119.

The master cylinder unit 120 detects whether the pedal 119 is operated and generates a hydraulic pressure by driving a motor 129. The master cylinder unit 120 may form one chamber, and the motor 129 may be driven in a forward or backward direction depending on a pressure increase state of the pedal 119. The master cylinder unit 120 may be connected to the pedal cylinder unit 110 through a cylinder line unit 128.

The first main hydraulic unit 130 is connected to the master cylinder unit 120 and guides the braking fluid to some of the plurality of wheel cylinder units 4.

In more detail, the first main hydraulic unit 130 may include a 1-1 hydraulic line unit 131 connected to the master cylinder unit 120 to guide the braking fluid, and a 1-2 hydraulic line unit 132 connected to the 1-1 hydraulic line unit 131 and branched off to a first wheel cylinder unit 5 to guide the braking fluid to the first wheel cylinder unit 5. In this case, the two first wheel cylinder units 5 may each be disposed at one of the rear wheels.

The second main hydraulic unit 140 connects the master cylinder unit 120 and the auxiliary brake unit 3 and guides a brake hydraulic pressure to the rest of the plurality of wheel cylinder units 4.

In more detail, the second main hydraulic unit 140 may include a 2-1 hydraulic line unit 141 connected to the master cylinder unit 120 to guide a brake hydraulic pressure, and a 2-2 hydraulic line unit 142 connected to the 2-1 hydraulic line unit 141 and branched off to the auxiliary brake unit 3 to guide a braking fluid to the auxiliary brake unit 3. In this case, the auxiliary brake unit 3 may be connected to a second wheel cylinder unit 6, and two second wheel cylinder units 6 may each be disposed at one of the front wheels and may include a first wheel unit 6a and a second wheel unit 6b.

Meanwhile, the first wheel cylinder unit 5 may be disposed at the front wheel, the second wheel cylinder unit 6 may be disposed at the rear wheel, and the auxiliary brake unit 3 may be connected to a main power wheel in a vehicle driving method.

The third main hydraulic unit 150 connects or disconnects the first main hydraulic unit 130 to or from the second main hydraulic unit 140. For example, the third main hydraulic unit 150 may connect the 1-2 hydraulic line unit 132 and the 2-2 hydraulic line unit 142.

Figure 3:
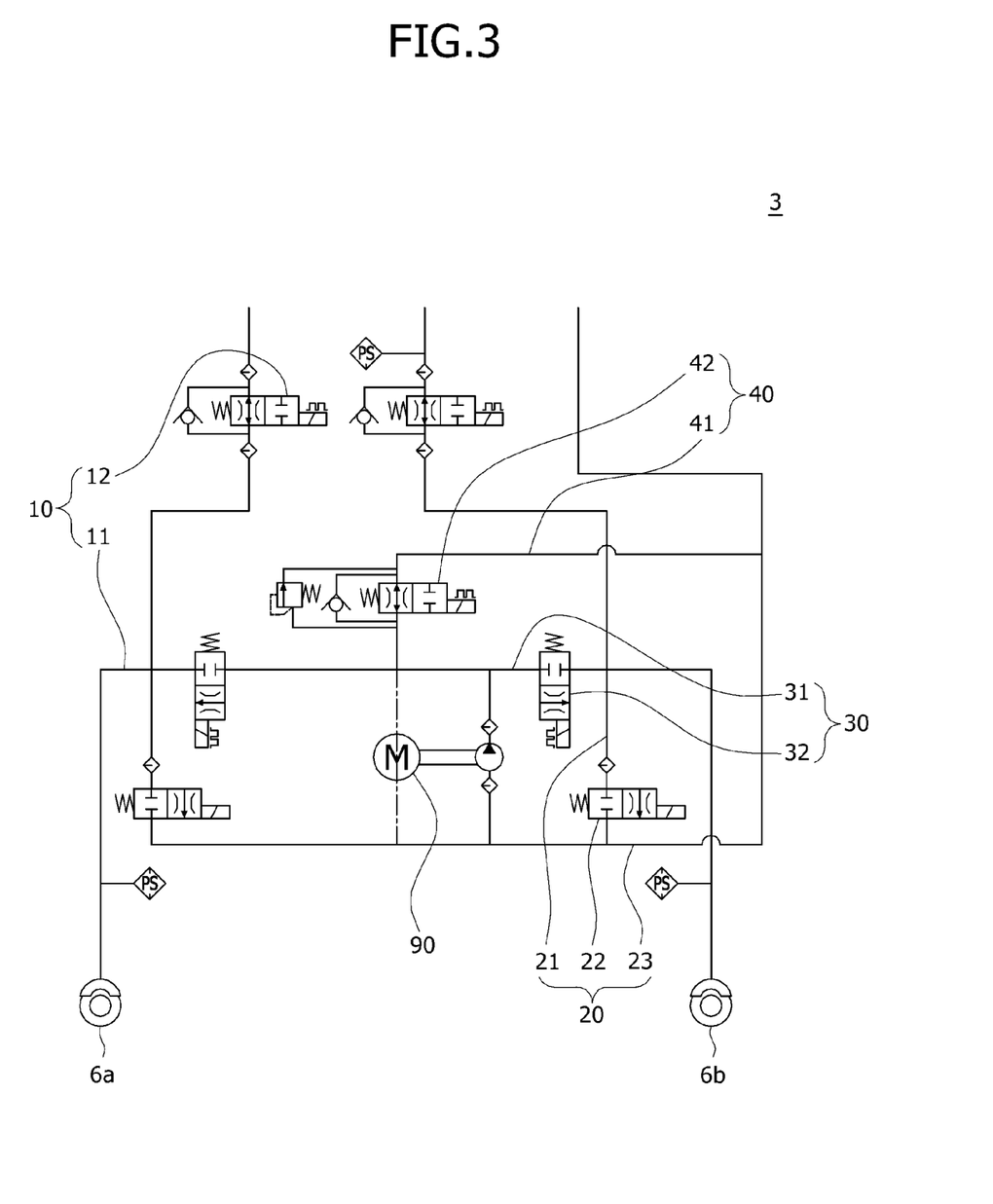
FIG. 3 is a view schematically illustrating an auxiliary brake unit according to an embodiment of the present disclosure.

FIG. 3 is a view schematically illustrating an auxiliary brake unit according to an embodiment of the present disclosure. Referring IGS.IGS. 2 and 3, the auxiliary brake unit 3 according to the embodiment of the present disclosure includes a first auxiliary flow path unit a second auxiliary flow path unit 20, and a third auxiliary flow path unit 30.

The first auxiliary flow path unit 10 connects the second main hydraulic unit 140 and a wheel cylinder unit 4 to control a flow of the braking fluid. For example, two first auxiliary flow path units 10 may each be connected to one of branched 2-2 hydraulic line units 142. The first auxiliary flow path unit 10 may pass or block the braking fluid and may control a set pressure of the braking fluid as necessary.

The second auxiliary flow path unit 20 controls the braking fluid after connecting the first auxiliary flow path unit 10 and an electric pump unit 90. For example, one end of the second auxiliary flow path unit 20 may be connected to each of the first auxiliary flow path units 10, and the other end thereof may be connected to the electric pump unit 90. The second auxiliary flow path unit 20 may be connected to the storage unit 2. Meanwhile, the electric pump unit 90 is a device that forcibly supplies the braking fluid as power is applied and is driven to supply the braking fluid when an error of the main brake unit 1 occurs.

The third auxiliary flow path unit 30 controls the braking fluid after connecting the electric pump unit 90 and the first auxiliary flow path unit 10. For example, the third auxiliary flow path unit 30 may be connected to the electric pump unit 90 and branched off, or may be connected to the electric pump unit 90 and guide the braking fluid discharged from the electric pump unit 90 to the first auxiliary flow path unit 10.

More specifically, the first auxiliary flow path unit 10 includes a first flow path line unit 11 and a first flow path valve unit 12.

The first flow path line unit 11 connects the second main hydraulic unit 140 and the wheel cylinder unit 4 to guide the braking fluid. For example, one end of the first flow path line unit 11 may be connected to each of the 2-2 hydraulic line units 142, and the other end may be connected to the second wheel cylinder unit 6.

The first flow path valve unit 12 is formed in the first flow path line unit 11 and opens or closes the first flow path line unit 11. For example, the first flow path valve unit 12 may pass or block the braking fluid and may control the set pressure of the braking fluid as necessary. The first flow path valve unit 12 may be disposed in the first flow path line unit 11 formed between the second main hydraulic unit 140 and a connection point of the first flow path line unit 11, the second auxiliary flow path unit 20, and the third auxiliary flow path unit 30.

The second auxiliary flow path unit 20 includes a second flow path line unit 21 and a second flow path valve unit 22.

The second flow path line unit 21 connects the first auxiliary flow path unit 10 and the electric pump unit 90 to guide the braking fluid. In addition, the second flow path valve unit 22 is formed in the second flow path line unit 21 to open or close the second flow path line unit 21.

For example, one end of the second flow path line unit 21 may be connected to the first flow path line unit 11, and the other end thereof may be connected to the electric pump unit 90. In addition, the second flow path valve unit 22 may be disposed in the second flow path line unit 21 formed between the electric pump unit 90 and a connection point of the first flow path line unit 11 and the second flow path line unit 21. A pair of second flow path line units 21 may be connected to each other and may be connected to the electric pump unit 90 through a single line or individual lines.

The second auxiliary flow path unit 20 may further include a second flow path connection unit 23. The second flow path connection unit 23 connects the second flow path line unit 21 and the storage unit 2. For example, the second flow path connection unit 23 may be connected to the second flow path line unit 21 formed between the second flow path valve unit 22 and the electric pump unit 90. Accordingly, bridging quality can be improved because the braking fluid supplied from the storage unit 2 may be supplied to the electric pump unit 90 without passing through a separate valve.

The third auxiliary flow path unit 30 includes a third flow path line unit 31 and a third flow path valve unit 32.

The third flow path line unit 31 connects the electric pump unit 90 and the first auxiliary flow path unit 10 to guide the braking fluid. Then, the third flow path valve unit 32 is formed in the third flow path line unit 31 to open or close the third flow path line unit 31.

For example, because the pair of third flow path line units 31 are connected to each other to guide the braking fluid to the first flow path line unit 11, the electric pump unit 90 may be commonly used. The third flow path line unit 31 may be connected to the electric pump unit 90 through a single line or individual lines. The third flow path valve unit 32 may be disposed in the third flow path line unit 31 formed between the electric pump unit 90 and a connection point of the third flow path line unit 31 and the first flow path line unit 11.

Meanwhile, the third flow path valve unit 32 opens the third flow path line unit 31 so that the braking fluid discharged from the electric pump unit 90 is supplied to the wheel cylinder unit 4. In this case, the second flow path valve unit 22 may close the second flow path line unit 21.

The auxiliary brake unit 3 according to the embodiment of the present disclosure may further include a fourth auxiliary flow path unit 40. The fourth auxiliary flow path unit 40 controls the braking fluid after connecting the third auxiliary flow path unit 30 and the storage unit 2. For example, the fourth auxiliary flow path unit 40 may pass or block the braking fluid and may control the set pressure of the braking fluid as necessary.

More specifically, the fourth auxiliary flow path unit 40 includes a fourth flow path line unit 41 and a fourth flow path valve unit 42.

The fourth flow path line unit 41 connects the third auxiliary flow path unit 30 and the storage unit 2 to guide the braking fluid. Then, the fourth flow path valve unit 42 is formed in the fourth flow path line unit 41 to open or close the fourth flow path line unit 41. The fourth flow path valve unit 42 may pass or block the braking fluid and may control the set pressure of the braking fluid as necessary.

For example, one end portion of the fourth flow path line unit 41 may be connected to the third flow path line unit 31, and the other end portion thereof may be directly connected to the storage unit 2 or may be connected to the second flow path connection unit 23 connected to the storage unit 2. More specifically, the fourth flow path line unit 41 may be connected to the third flow path line unit 31 formed between the electric pump unit 90 and the third flow path valve unit 32.

Meanwhile, the second flow path connection unit 23 may be connected to the fourth flow path line unit 41 when the fourth flow path line unit 41 is directly connected to the storage unit 2. In this case, a fourth flow path valve unit 42 may be disposed in the fourth flow path line unit 41 formed between the third flow path line unit 31 and a connection point of the fourth flow path line unit 41 and the second flow path connection unit 23.

Figure 4:
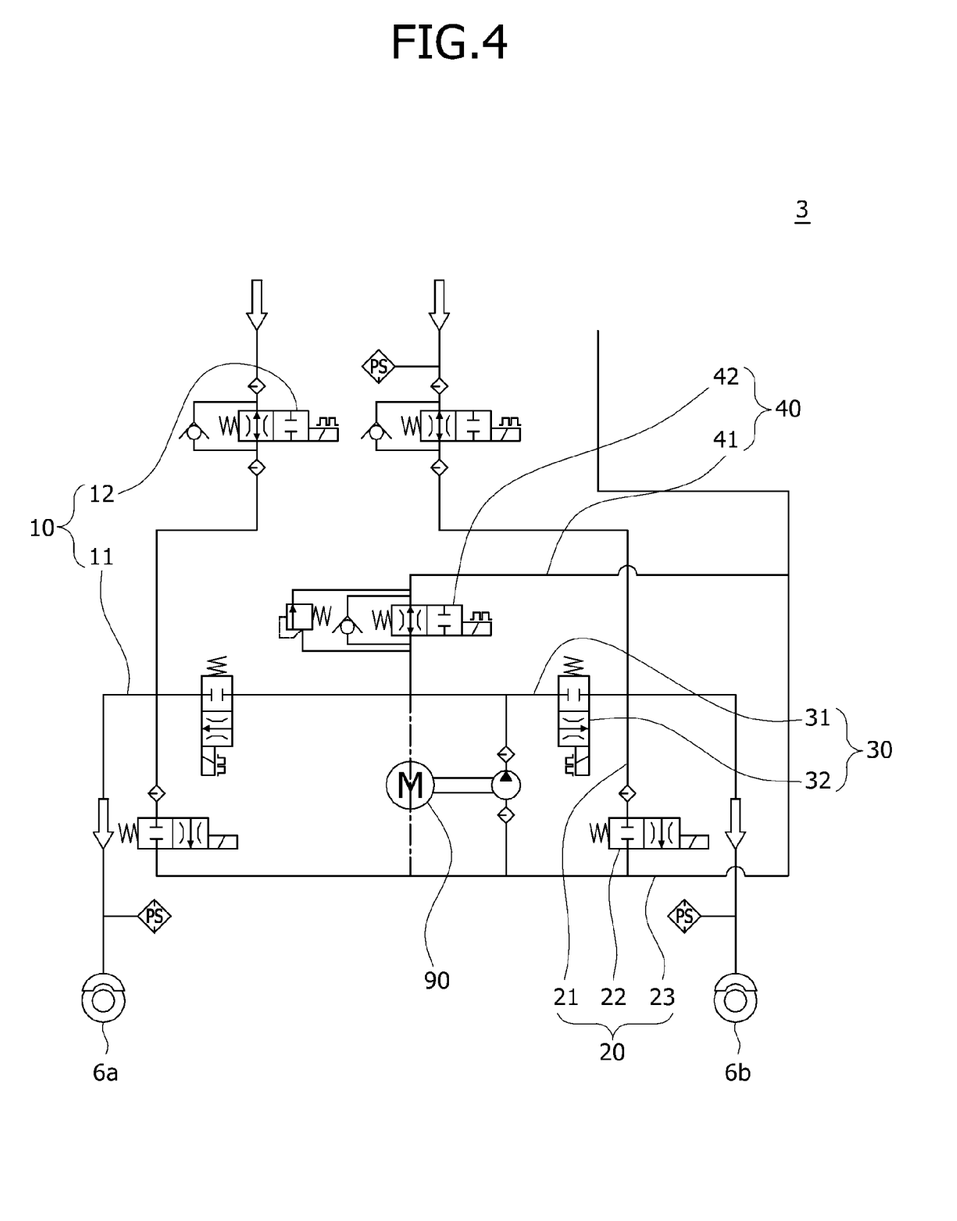
FIG. 4 is a view schematically illustrating a normal operating state of a main brake unit in an electro-hydraulic brake device according to an embodiment of the present disclosure.

FIG. 4 is a view schematically illustrating a normal operating state of a main brake unit in an electro-hydraulic brake device according to an embodiment of the present disclosure. Referring to FIG. 4, when the pedal 119 is pressurized or braking is required through the autonomous driving system while the main braking unit 1 is in a normal state, the motor 129 of the master cylinder unit 120 is driven. Accordingly, the hydraulic pressure generated by the master cylinder unit 120 is increased, and the braking fluid is supplied to the first main hydraulic unit 130 and the second main hydraulic unit 140.

The braking fluid passing through the first main hydraulic unit 130 is supplied to the first wheel cylinder unit 5 to perform rear wheel braking. Then, the braking fluid passing through the second main hydraulic unit 140 passes through the auxiliary brake unit 3 and is supplied to the second wheel cylinder unit 6 to perform front wheel braking.

In the auxiliary brake unit 3, the first flow path valve unit 12 opens the first flow path line unit 11, the second flow path valve unit 22 closes the second flow path line unit 21, and the third flow path valve unit 32 closes the third flow path line unit 31. In this case, the fourth flow path valve unit 42 may open the fourth flow path line unit 41.

Figure 5:
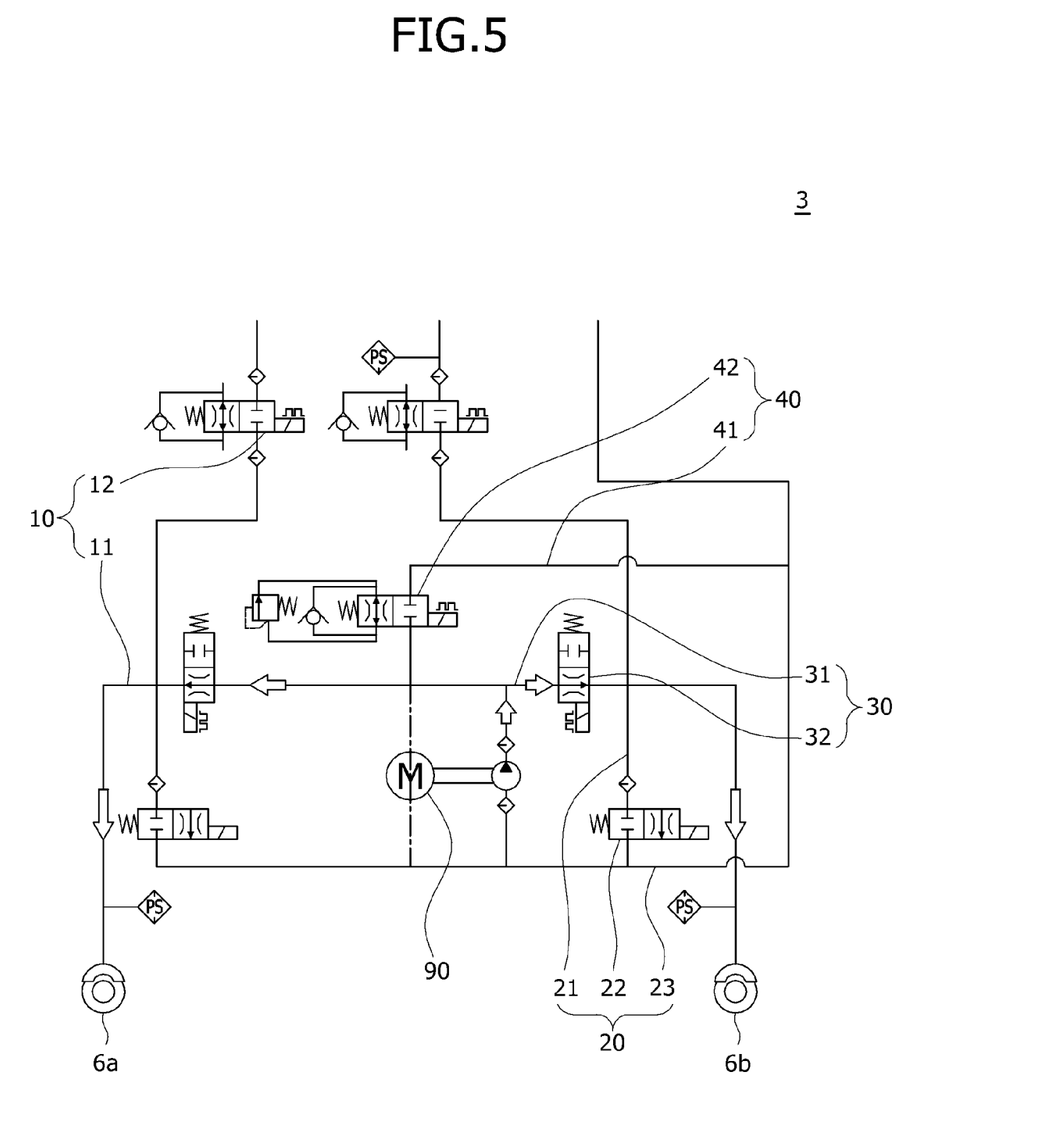
FIG. 5 is a view schematically illustrating a two-wheel pressure increase state of an auxiliary brake unit including an electric pump unit according to a first embodiment of the present disclosure.

FIG. 5 is a view schematically illustrating a two-wheel pressure increase state of an auxiliary brake unit including an electric pump unit according to a first embodiment of the present disclosure. Referring to FIG. 5, when the main brake unit 1 is in an abnormal operation state, the first flow path valve unit 12 closes the first flow path line unit 11, the second flow path valve unit 22 closes the second flow path line unit 21, and the third flow path valve unit 32 opens the third flow path line unit 31. Then, the fourth flow path valve unit 42 may close the fourth flow path line unit 41 or control the set pressure.

When one pump provided in the electric pump unit 90 is driven in the above-described state, the braking fluid discharged from the electric pump unit 90 is branched off through the third flow path line unit 31 and supplied to each of the second wheel cylinder units 6, thereby performing front wheel braking. In this case, the braking fluid stored in the storage unit 2 through the second flow path connection unit 23 may be supplied to the electric pump unit 90 without passing through the valve thereof.

Figure 6:
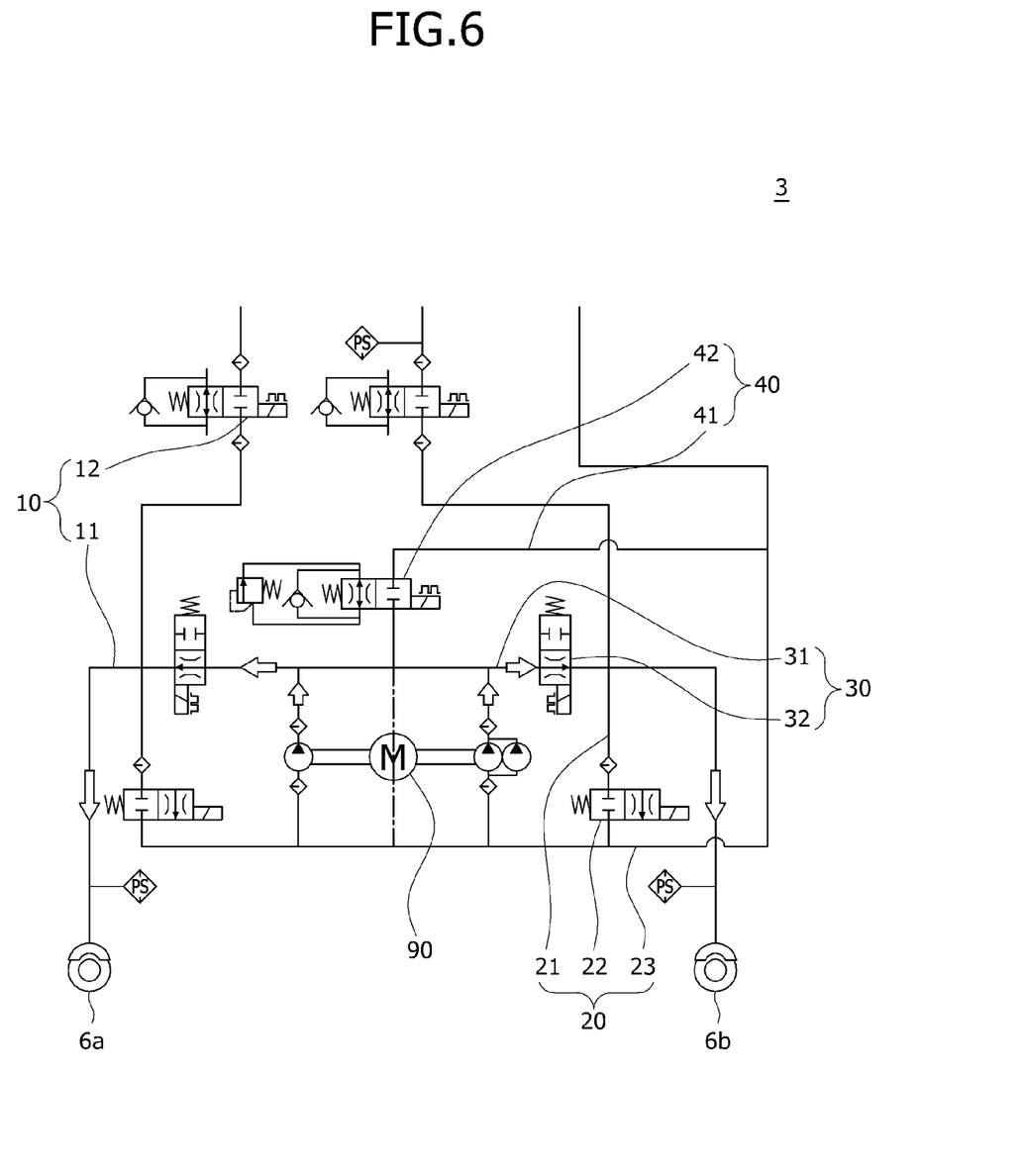
FIG. 6 is a view schematically illustrating a two-wheel pressure increase state of an auxiliary brake unit including an electric pump unit according to a second embodiment of the present disclosure.

FIG. 6 is a view schematically illustrating a two-wheel pressure increase state of an auxiliary brake unit including an electric pump unit according to a second embodiment of the present disclosure. Referring to FIG. 6, when the main brake unit 1 is in an abnormal operation state, the first flow path valve unit 12 closes the first flow path line unit 11, the second flow path valve unit 22 closes the second flow path line unit 21, and the third flow path valve unit 32 opens the third flow path line unit 31. In addition, the fourth flow path valve unit 42 may close the fourth flow path line unit 41 or control the set pressure.

When three pumps provided in the electric pump unit 90 are driven in the above-described state, the braking fluid discharged from the electric pump unit 90 is supplied to the second wheel cylinder unit 6 through the third flow path line unit 31, thereby performing the front wheel braking. In this case, the braking fluid stored in the storage unit 2 through the second flow path connection unit 23 may be supplied to the electric pump unit 90.

Figure 7:
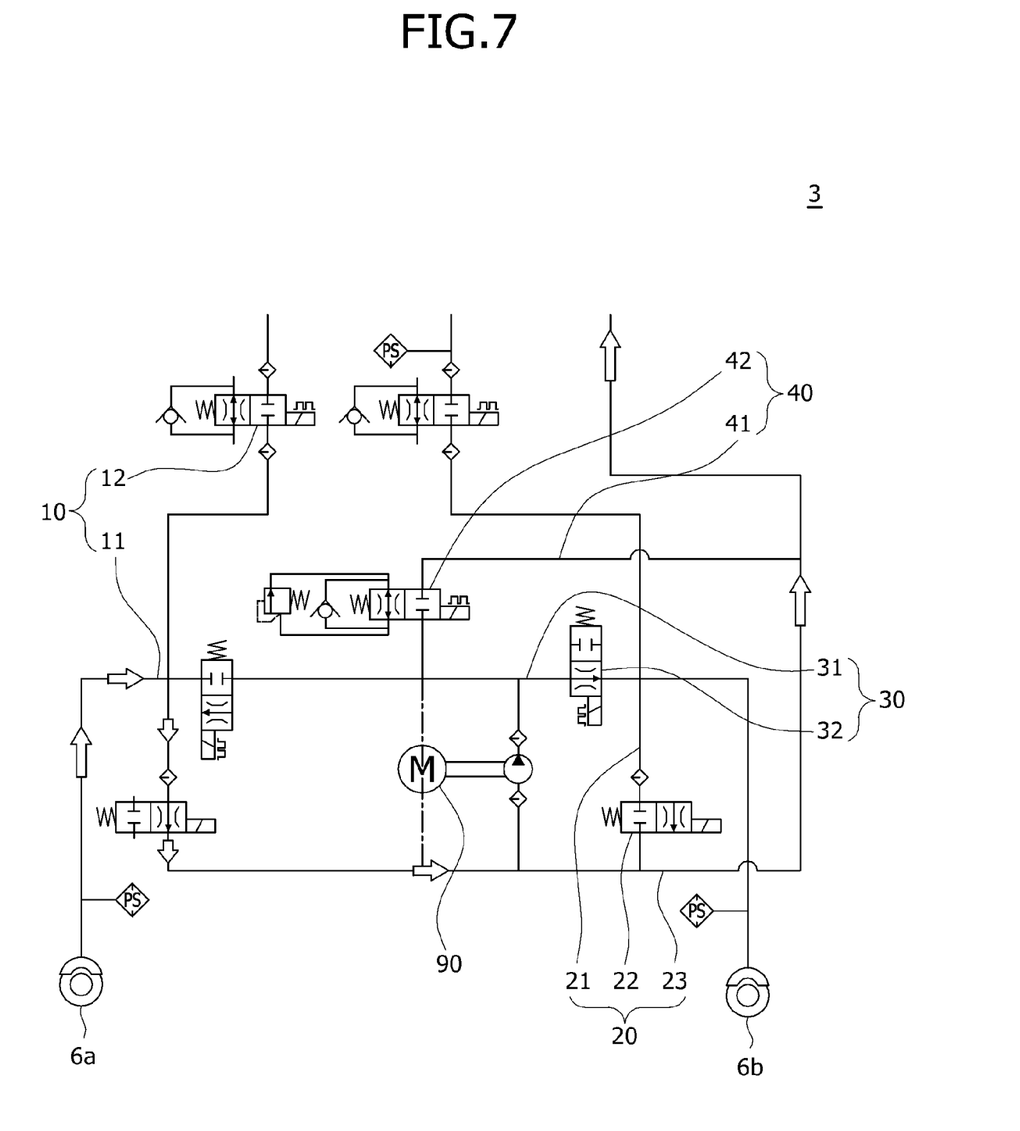
FIG. 7 is a view schematically illustrating a one-wheel decompression state of an auxiliary brake unit according to an embodiment of the present disclosure.

FIG. 7 is a view schematically illustrating a one-wheel decompression state of an auxiliary brake unit according to an embodiment of the present disclosure, which may be an anti-lock braking system (ABS) one-wheel decompression state. Referring to FIG. 7, when the main brake unit 1 is in an abnormal operation state, the first flow path valve unit 12 closes the first flow path line unit 11. Then, the second flow path valve unit 22 formed in the second flow path line unit 21 connected to a first wheel unit 6a to be decompressed opens the second flow path line unit 21. On the other hand, the second flow path valve unit 22 formed in the second flow path line unit 21 connected to the second wheel unit 6b to not be decompressed closes the second flow path line unit 21.

In this case, the third flow path valve unit 32 formed in the third flow path line unit 31 connected to the first wheel unit 6a to be decompressed closes the third flow path line unit 31. On the other hand, a third flow path valve unit 32 formed in a third flow path line unit connected to the second wheel unit 6b to not be decompressed opens the third flow path line unit 31. Meanwhile, the fourth flow path valve unit 42 may close the fourth flow path line unit 41 or control the set pressure.

In the above state, the braking fluid supplied to the first wheel unit 6a to be decompressed is moved to the storage unit 2 sequentially through the first flow path line unit 11, the second flow path line unit 21, and the second flow path connection unit 23.

Figure 8:
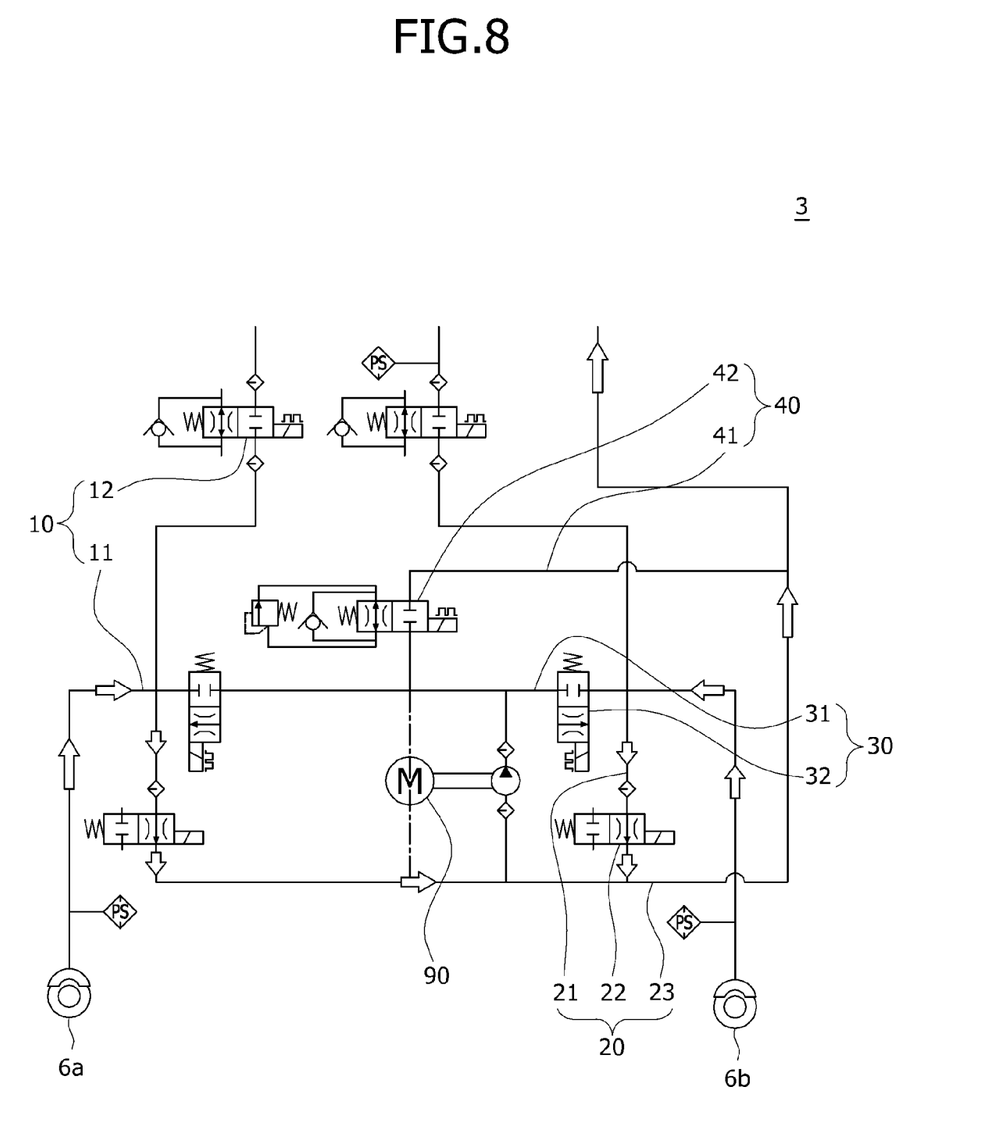
FIG. 8 is a view schematically illustrating a two-wheel decompression state of an auxiliary brake unit according to an embodiment of the present disclosure.

FIG. 8 is a view schematically illustrating a two-wheel decompression state of an auxiliary brake unit according to an embodiment of the present disclosure, which may be an ABS two-wheel decompression state. Referring to FIG. 8, when the main brake unit 1 is in an abnormal operation state, the first flow path valve unit 12 closes the first flow path line unit 11, and the second flow path valve unit 22 opens the second flow path line unit 21. In this case, the third flow path valve unit 32 formed in the third flow path line unit 31 connected to the second wheel cylinder unit 6 to be decompressed closes the third flow path line unit 31. Meanwhile, the fourth flow path valve unit 42 may close the fourth flow path line unit 41 or control the set pressure.

In the above state, the operation of the electric pump unit 90 is stopped, and the braking fluid supplied to the second wheel cylinder unit 6 to be decompressed is moved to the storage unit 2 sequentially through the first flow path line unit 11, the second flow path line unit 21, and the second flow path connection unit 23, thereby performing two wheel decompression.

Figure 9:
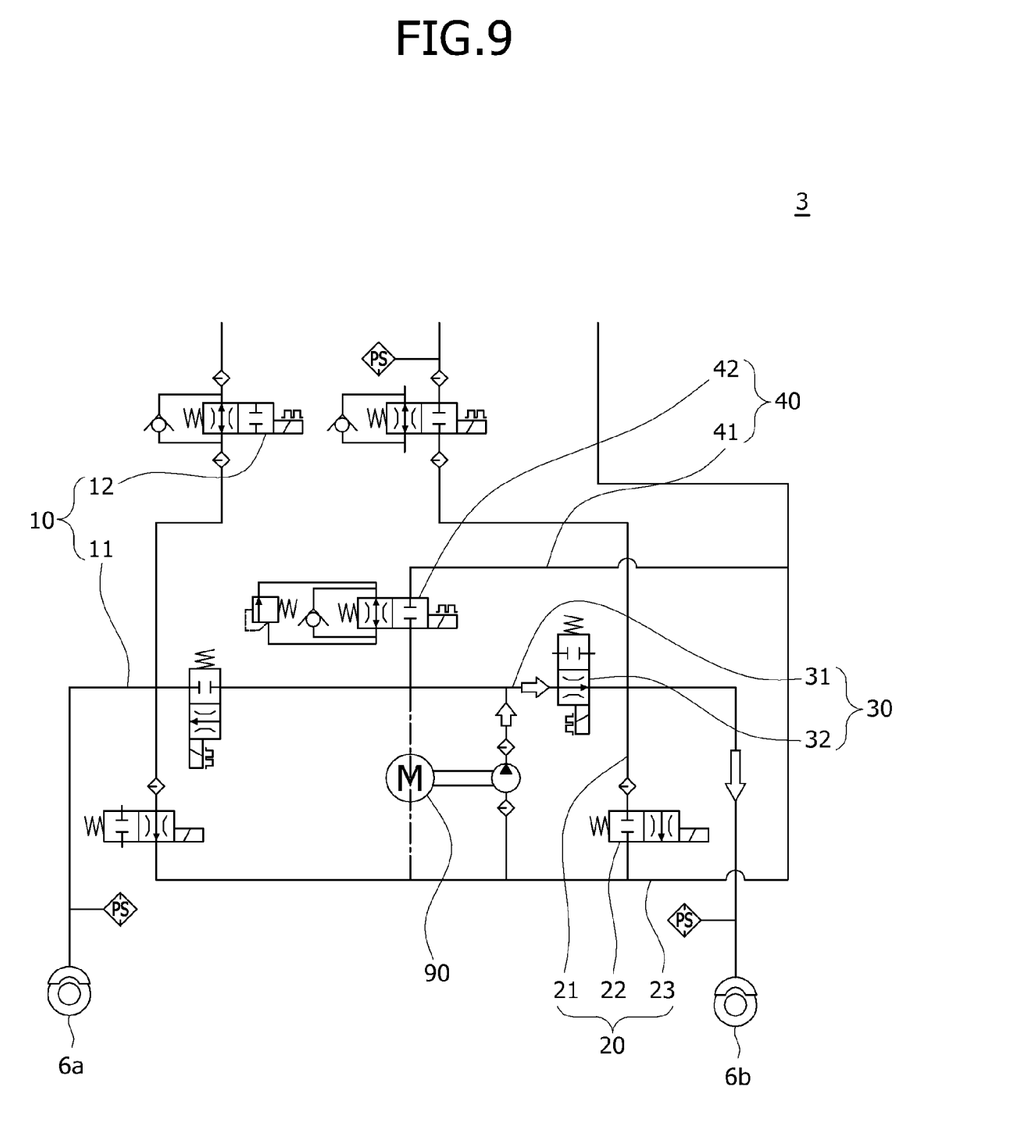
FIG. 9 is a view schematically illustrating a one-wheel pressure increase state of an auxiliary brake unit according to an embodiment of the present disclosure.

FIG. 9 is a view schematically illustrating a one-wheel pressure increase state of an auxiliary brake unit according to an embodiment of the present disclosure, which may be a vehicle dynamic control (VDC) one-wheel pressure increase state. Referring to FIG. 9, the first flow path valve unit 12 formed in the first flow path line unit 11 connected to the second wheel unit 6b of which a pressure will be increased closes the first flow path line unit 11. On the other hand, the first flow path valve unit 12 formed in the first flow path line unit 11 connected to the first wheel unit 6a of which a pressure will not be increased opens the first flow path line unit 11.

In addition, the second flow path valve unit 22 formed in the second flow path line unit 21 connected to the second wheel unit 6b of which a pressure will be increased closes the second flow path line unit 21. On the other hand, the second flow path valve unit 22 formed in the second flow path line unit 21 connected to the first wheel unit 6a of which a pressure will not be increased opens the second flow path line unit 21.

In this case, the third flow path valve unit 32 formed in the third flow path line unit 31 connected to the second wheel unit 6b of which a pressure will be increased opens the third flow path line unit 31. On the other hand, a third flow path valve unit 32 formed in a third flow path line unit connected to the first wheel unit 6a of which a pressure will not be increased closes the third flow path line unit 31. Meanwhile, the fourth flow path valve unit 42 may close the fourth flow path line unit 41 or control the set pressure.

When the electric pump unit 90 is driven in the above state, the braking fluid discharged from the electric pump unit 90 is supplied to the second wheel unit 6b of which a pressure will be increased through the third flow path line unit 31, thereby performing braking.

Figure 10:
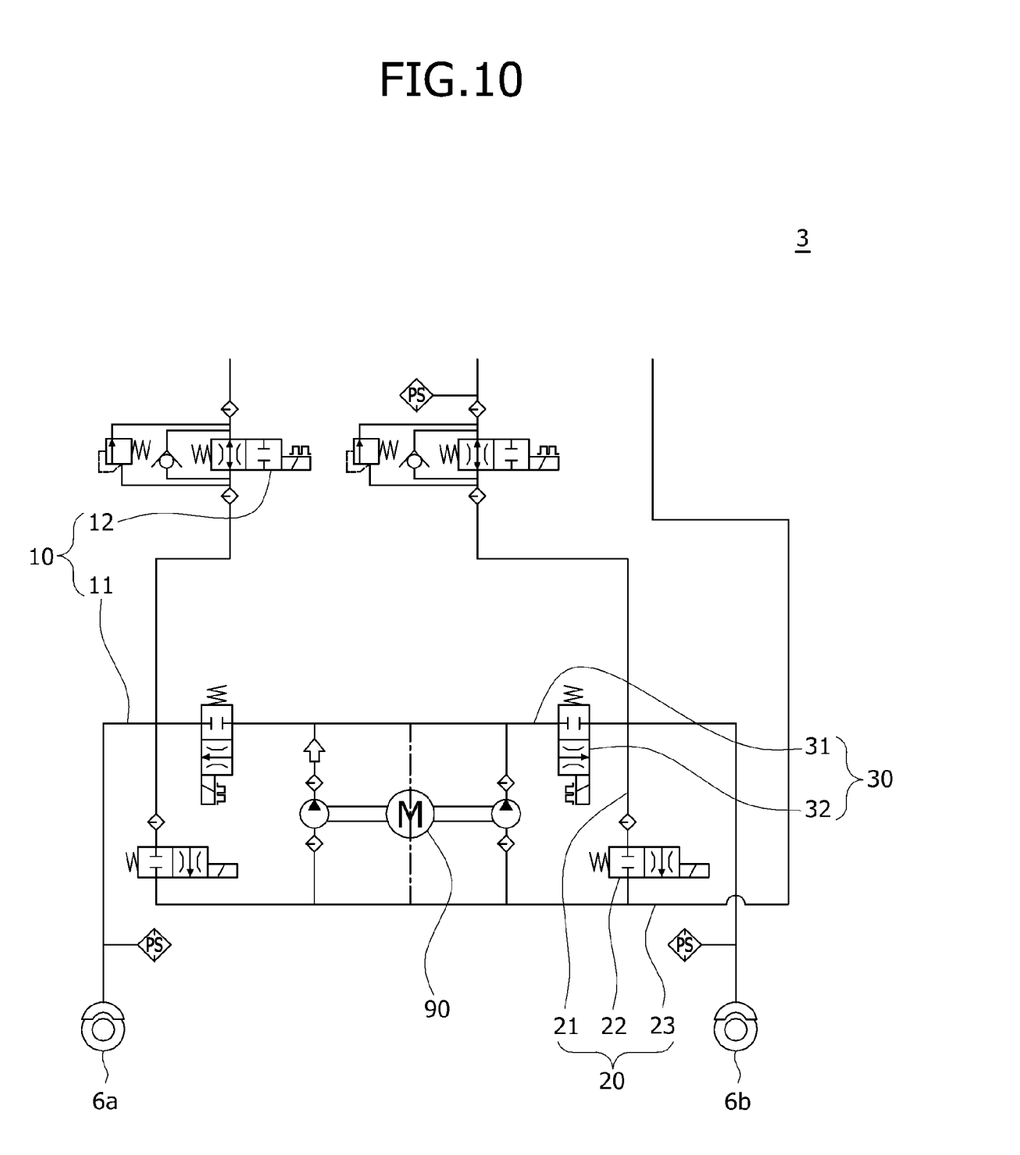
FIG. 10 is a view schematically illustrating a hydraulic control state of the auxiliary brake unit according to the first embodiment of the present disclosure.

FIG. 10 is a view schematically illustrating a hydraulic control state of the auxiliary brake unit according to the first embodiment of the present disclosure, and since the pedal 119 is removed or an electric pedal is used, control disturbance of the auxiliary brake unit 3 does not occur even when a driver intervenes. Referring to FIG. 10, the first flow path valve unit 12 may control the set pressure of the braking fluid. In this case, the fourth auxiliary flow path unit 40 in the hydraulic circuit may be omitted.

Figure 11:
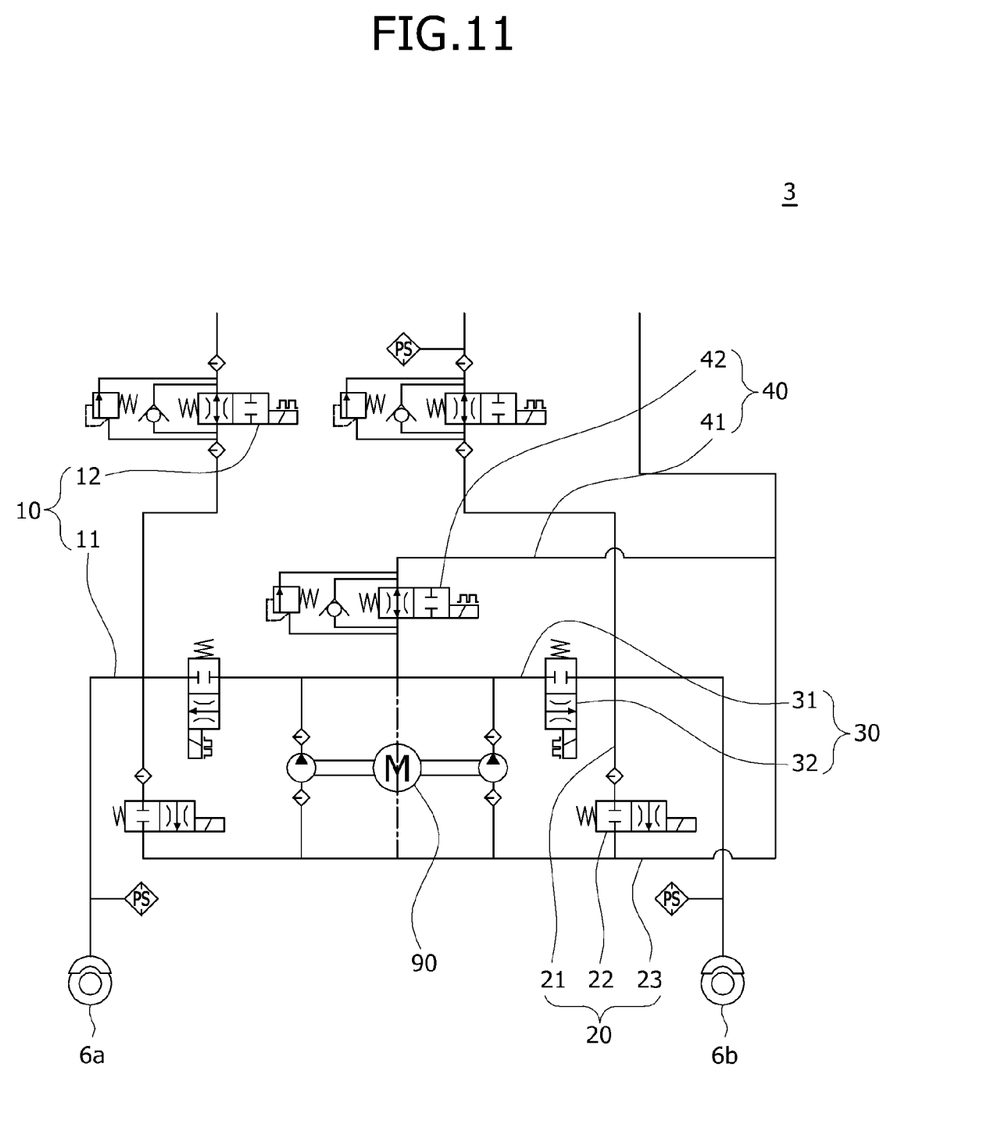
FIG. 11 is a view schematically illustrating a hydraulic control state of the auxiliary brake unit according to the second embodiment of the present disclosure.
Figure 12:
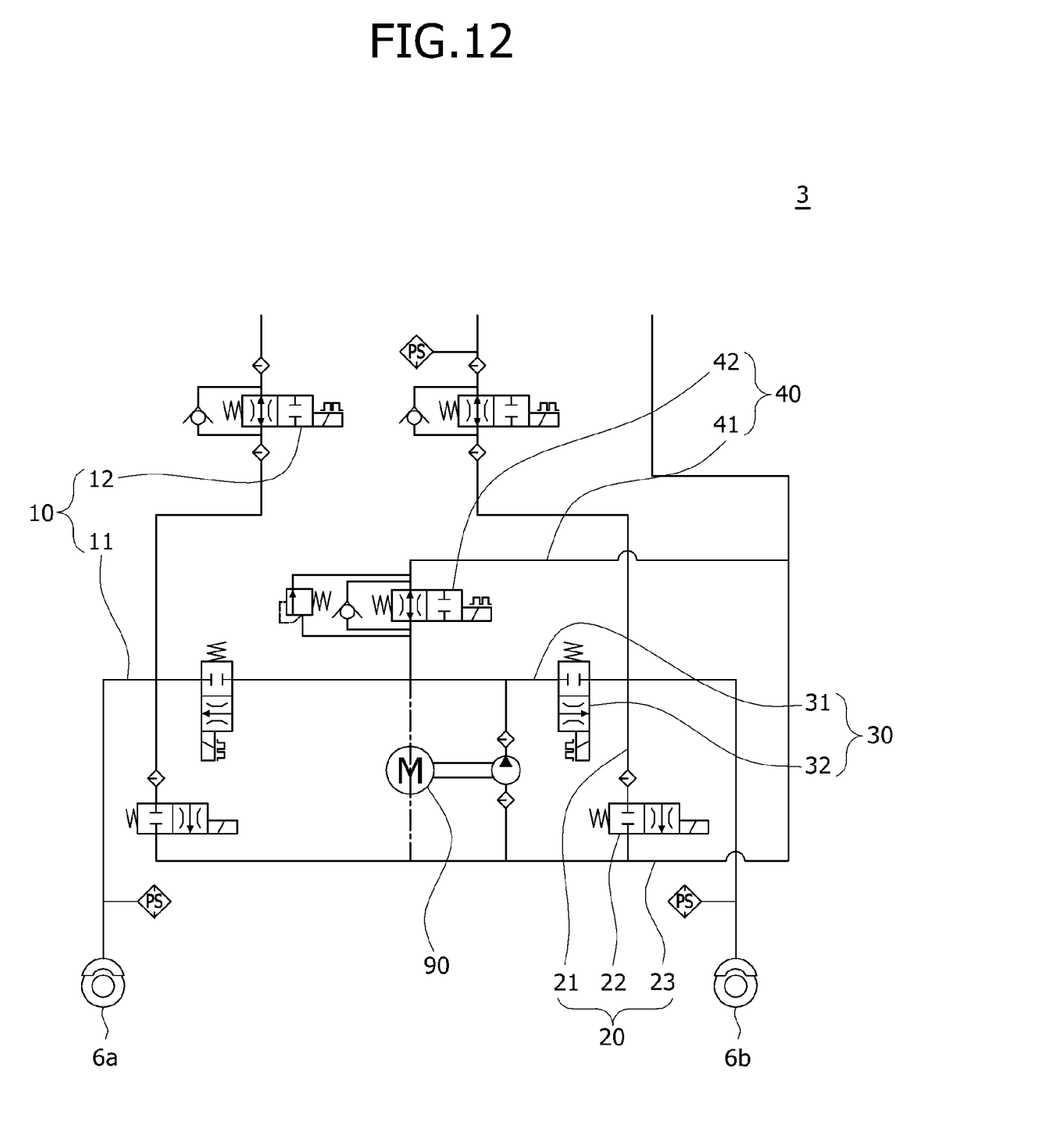
FIG. 12 is a view schematically illustrating a hydraulic control state of an auxiliary brake unit according to a third embodiment of the present disclosure.

FIG. 11 is a view schematically illustrating a hydraulic control state of the auxiliary brake unit according to the second embodiment of the present disclosure, FIG. 12 is a view schematically illustrating a hydraulic control state of the auxiliary brake unit 3 according to a third embodiment of the present disclosure, and the hydraulic circuit minimizes a control disturbance of the auxiliary brake unit 3 when the driver intervenes and steps on the pedal 119. Referring to FIG. 11, the first flow path valve unit 12 may control the set pressure of the braking fluid, and the fourth flow path valve unit 42 may control the set pressure of the braking fluid. Meanwhile, referring to FIG. 12, the first flow path valve unit 12 may control only ON/OFF of the first flow path line unit 11, and only the fourth flow path valve unit 42 may control the set pressure of the braking fluid.

In the electro-hydraulic brake device according to the embodiment of the present disclosure, the main brake unit 1 and the auxiliary brake unit 3 may be connected to each other through the hydraulic circuit, and when an operation error of the main brake unit 1 occurs, the auxiliary brake unit 3 may be driven to perform braking.

In the electro-hydraulic brake device according to the embodiment of the present disclosure, the first auxiliary flow path unit 10 may control the flow of the braking fluid after connecting the main brake unit 1 and the wheel cylinder unit 4, the second auxiliary flow path unit 20 may control the flow of the braking fluid after connecting the first auxiliary flow path unit 10 and the electric pump unit 90, the third auxiliary flow path unit 30 controls the braking fluid after connecting the electric pump unit 90 and the first auxiliary flow path unit 10, and therefore, the hydraulic circuit may be physically divided according to a function.

In the electro-hydraulic brake device according to the embodiment of the present disclosure, the second auxiliary flow path unit 20 is connected to the storage unit 2, and valve resistance to the braking fluid provided to the electric pump unit 90 is omitted, therefore bridging quality can be improved.

Although exemplary embodiments of the disclosure have been described for illustrative purposes, those skilled in the art will appreciate that various modifications, additions and substitutions are possible, without departing from the scope and spirit of the disclosure as defined in the accompanying claims.

Thus, the true technical scope of the disclosure should be defined by the following claims.

What is claimed is:

1. An electro-hydraulic brake device comprising:
   a main brake unit connected to and configured to provide a braking fluid to a plurality of wheel cylinder units of a vehicle, the plurality of wheel cylinder units respectively coupled to a plurality of wheels of the vehicle, configured to perform wheel braking of the vehicle using the provided braking fluid, and including one or more first wheel cylinder units and one or more second wheel cylinder units;
   a storage unit connected to the main brake unit and having a storage space for storing the braking fluid; and
   an auxiliary brake unit connected to the main brake unit and the storage unit and configured to provide the braking fluid to at least some of the plurality of wheel cylinder units when an operation error occurs at the main brake unit, wherein a hydraulic circuit is physically divided in the auxiliary brake unit,
   wherein the auxiliary brake unit comprises:
   a first auxiliary flow path unit connected to and extending between the main brake unit and the one or more second wheel cylinder units and configured to control a flow of the braking fluid from the main brake unit to the one or more second wheel cylinder units;
   a second auxiliary flow path unit connected to and extending between the first auxiliary flow path unit and an electric pump unit and configured to control the flow of the braking fluid from the first auxiliary flow path unit to the electric pump unit; and
   a third auxiliary flow path unit connected to and extending between the electric pump unit and the first auxiliary flow path unit and configured to control the flow of the braking fluid from the electric pump unit to the first auxiliary flow path unit.

2. The electro-hydraulic brake device of claim 1, wherein the main brake unit comprises:
   a pedal cylinder unit configured to generate a first hydraulic pressure when a driver presses a pedal of the vehicle;
   a master cylinder unit configured to detect the driver's pressing of the pedal and generate a second hydraulic pressure;
   a first main hydraulic unit disposed between the master cylinder unit and the one or more first wheel cylinder units and configured to guide the braking fluid to the one or more first wheel cylinder units;
   a second main hydraulic unit disposed between the master cylinder unit and the auxiliary brake unit and configured to guide the braking fluid to the one or more second wheel cylinder units; and
   a third main hydraulic unit disposed between the first and second main hydraulic units and configured to selectively connect the first and second main hydraulic units.

3. The electro-hydraulic brake device of claim 2, wherein:
the one or more first wheel cylinder units include the wheel cylinder unit disposed at a rear wheel of the vehicle, and
the one or more second wheel cylinder units include the wheel cylinder unit disposed at a front wheel of the vehicle.

4. The electro-hydraulic brake device of claim 2, wherein the first main hydraulic unit and the auxiliary brake unit are connected to allow the braking fluid to move therebetween.

5. The electro-hydraulic brake device of claim 1, wherein the first auxiliary flow path unit comprises:
a first flow path line unit connecting the second main hydraulic unit and the one or more second wheel cylinder unit; and
a first flow path valve unit disposed at the first flow path line unit and configured to open or close the first flow path line unit.

6. The electro-hydraulic brake device of claim 1, wherein the second auxiliary flow path unit comprises:
a second flow path line unit connecting the first auxiliary flow path unit and the electric pump unit; and
a second flow path valve unit disposed at the second flow path line unit and configured to open or close the second flow path line unit.

7. The electro-hydraulic brake device of claim 6, wherein the second auxiliary flow path unit further comprises a second flow path connection unit connecting the second flow path line unit and the storage unit.

8. The electro-hydraulic brake device of claim 1, wherein the third auxiliary flow path unit comprises:
a third flow path line unit connecting the electric pump unit and the first auxiliary flow path unit; and
a third flow path valve unit disposed at the third flow path line unit and configured to open or close the third flow path line unit.

9. The electro-hydraulic brake device of claim 8, wherein the braking fluid discharged from the electric pump unit is supplied to the one or more second wheel cylinder units when the third flow path line unit is opened by the third flow path valve unit.

10. The electro-hydraulic brake device of claim 1, wherein the auxiliary brake unit further comprises a fourth auxiliary flow path unit configured to control the flow of the braking fluid from the third auxiliary flow path unit to the storage unit.

11. The electro-hydraulic brake device of claim 10, wherein the fourth auxiliary flow path unit comprises;
a fourth flow path line unit connecting the third auxiliary flow path unit and the storage unit; and
a fourth flow path valve unit disposed at the fourth flow path line unit and configured to open or close the fourth flow path line unit.

* * * * *